United States Patent
Yoon et al.

(10) Patent No.: US 11,185,990 B2
(45) Date of Patent: Nov. 30, 2021

(54) METHOD FOR LEARNING AND EMBODYING HUMAN FACIAL EXPRESSION BY ROBOT

(71) Applicant: KOREA INSTITUTE OF INDUSTRIAL TECHNOLOGY, Cheonan-si (KR)

(72) Inventors: Han Ui Yoon, Suwon-si (KR); Dong Wook Lee, Incheon (KR); Hyun Jun Hyung, Ansan-si (KR); Duck Yeon Lee, Ansan-si (KR); Dong Woon Choi, Seoul (KR); Man Hong Hur, Ansan-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 485 days.

(21) Appl. No.: 16/205,139

(22) Filed: Nov. 29, 2018

(65) Prior Publication Data
US 2019/0321985 A1 Oct. 24, 2019

(30) Foreign Application Priority Data
Apr. 18, 2018 (KR) .......... 10-2018-0044995

(51) Int. Cl.
*B25J 11/00* (2006.01)
*G06K 9/00* (2006.01)
*B25J 9/16* (2006.01)

(52) U.S. Cl.
CPC .......... *B25J 11/0015* (2013.01); *B25J 9/163* (2013.01); *B25J 11/001* (2013.01); *G06K 9/00302* (2013.01); *G06K 9/00496* (2013.01)

(58) Field of Classification Search
CPC ...... B25J 11/0015; B25J 9/163; B25J 11/001; B25J 13/00; G06K 9/00302; G06K 9/00496; G06K 9/00885
See application file for complete search history.

(56) References Cited

FOREIGN PATENT DOCUMENTS

CN 101474481 B * 7/2010
JP 2017-1692409 A 9/2017

* cited by examiner

*Primary Examiner* — Basil T. Jos
(74) *Attorney, Agent, or Firm* — Rabin & Berdo, P.C.

(57) ABSTRACT

The present disclosure relates to a method for learning and embodying a human facial expression by a robot, in which human emotional indicators are allowed to match with servo motor parameter values of a robot and the robot automatically and mechanically learns a human expression to imitate the human expression.

7 Claims, 5 Drawing Sheets

METHOD FOR LEARNING AND EMBODYING HUMAN FACIAL EXPRESSION BY ROBOT

BACKGROUND OF THE INVENTION

Field of the Invention

The present invention relates to a method for learning and embodying a human facial expression by a robot, and more specifically, to a method for learning and embodying a human facial expression by a robot, in which human emotional indicators are allowed to match with servo motor parameter values of a robot and the robot automatically and mechanically learns a human facial expression to imitate the human expression.

Description of the Related Art

Conventionally, in order for a robot to imitate a human facial expression, a consuming and repetitive method has been used in which initial parameters are set in accordance with facial action coding (FAC) proposed by Ekman and then continuous fine adjustment is manually performed.

More specifically, the number of servo motors for expressing human emotions is necessary generally more than the kind of human emotions. However, general mechanical learning can be applied when the number of input values is equal to or more than the number of output values, and it is impossible to apply the mechanical learning when the number of output values is more than the number of input values.

In other words, since the kind of human emotions as input values is less than the number of servo motors as output values, it is difficult to apply the mechanical learning. As a result, conventionally, a robot has been allowed to imitate a human facial expression by using a method of manually performing continuous fine adjustment.

However, in the prior art of imitating a human facial expression through manual fine adjustment as described above, feedback control is difficult, a robot has to be controlled to make an expression similar to a human facial expression depending on a human feeling, and a lot of time is consumed.

In addition, in the prior art, there is a problem that it is difficult to imitate a human face as it is, in a case of complex feelings of humans.

CITATION LIST

Patent Literature

Patent Literature 1: Japanese Patent Publication No. 2017-162409

SUMMARY OF THE INVENTION

An object of the present invention to solve the problem described above is to provide a method for learning and embodying a human facial expression by a robot to automatically and mechanically learn and imitate a human expression by matching emotional indicators of a human and servo motor parameter values of a robot.

A technical problem of the present invention is not limited to the technical problem mentioned above, and other technical problems which are not mentioned should be clearly understood by persons skilled in the art from the following description.

According to an embodiment of the present invention, there is provided a method for learning and embodying a human facial expression by a robot, including: a) a step of measuring epidermal electric sensor (EES) signals of human facial muscles in accordance with a preset human emotional indicator and deriving a plurality of human face motor units corresponding to the human emotional indicator; b) a step of deriving a plurality of robot face motor units to correspond to the human face motor units on the basis of servo motors installed to correspond to human facial muscles; c) a step of deriving a robot face control signal by combining the plurality of robot face motor units with a basic coefficient to express the human emotional indicator; d) a step of expressing a robot facial expression in accordance with the robot face control signal and deriving a robot emotional indicator; e) a step of deriving a differential emotional indicator which is difference between the human emotional indicator and the robot emotional indicator; f) a step of calculating a correction factor of the robot face motor unit from the differential emotional indicator; g) a step of deriving a new basic coefficient by summing the basic coefficient and the correction factor; and h) a step of deriving a new robot face control signal by combining the plurality of robot face motor units with the new basic coefficient, wherein in the step (e), the steps (d) to (h) are repeated until the differential emotional indicator satisfies a preset tolerance.

In the embodiment of the present invention, in the step (a), the human face motor unit may be derived by applying a non-negative matrix factorization (NMF) algorithm to time-series data of vector values of EES signals of human facial muscles.

In the embodiment of the present invention, in the step (a), the human emotional indicator may be the sum of vector values of EES signals measured from a human facial expression expressing an emotion.

In the embodiment of the present invention, in the step (b), the robot face motor unit may be formed by combination of the plurality of servo motors.

In the embodiment of the present invention, in the step (c), the robot face control signal may be formed of the sum of a plurality of basic coefficients multiplied in one-to-one correspondence with the plurality of robot face motor units.

In the embodiment of the present invention, in the step (d), the robot emotional indicator may be the sum of vector values of servo motors measured from the robot facial expression expressing an emotion.

According to an embodiment of the present invention, there is provided a robot to which the method for learning and embodying a human facial expression by a robot is applied.

Figure 1:
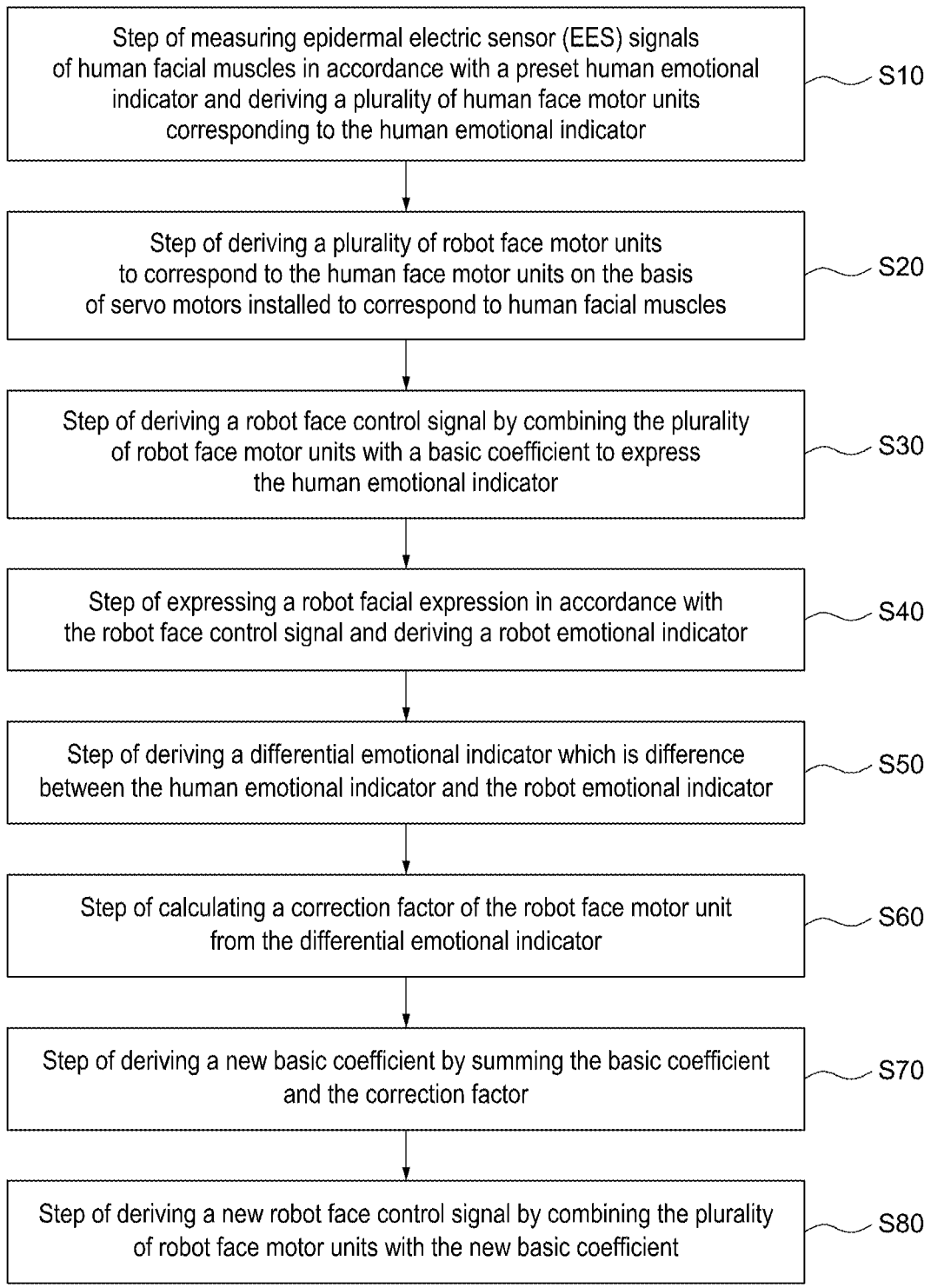
FIG. 1 is a flowchart illustrating a method for learning and embodying a human facial expression by a robot according to an embodiment of the present invention.

DETAILED DESCRIPTION OF THE
PREFERRED EMBODIMENTS

Hereinafter, the present invention will be described with reference to the accompanying drawings. However, the present invention can be embodied in various and different forms, and is not limited to embodiments described herein. In order to clearly describe the present invention, parts unrelated to description was omitted, and similar reference numerals and signs are given to similar parts throughout Specification.

Throughout the specification, when it is described that one part is "connected (contacted or coupled)" to the other part, this case includes "indirect connection" with another member interposed therebetween as well as "direct connection". In addition, when it is described that a certain part "includes" a certain constituent element, this means that the part does not exclude other constituent elements but may further include other constituent elements as long as there is no particularly opposite description.

Terms used in Specification are merely used to describe a specific embodiment, but does not intend to limit the present invention. Singular representation includes plural representation as long as there is no clearly different meaning contextually. In Specification, terms such as "include" or "have" are to designate existence of feature, numeral, step, operation, constituent element, part, or combination thereof described in the specification, but it should be understood that existence or addition probability of one or more other features, numerals, steps, operations, constituent elements, parts or combination thereof is not excluded in advance.

Hereinafter, embodiments of the present invention will be described in detail with reference to the accompanying drawings.

Figure 2:
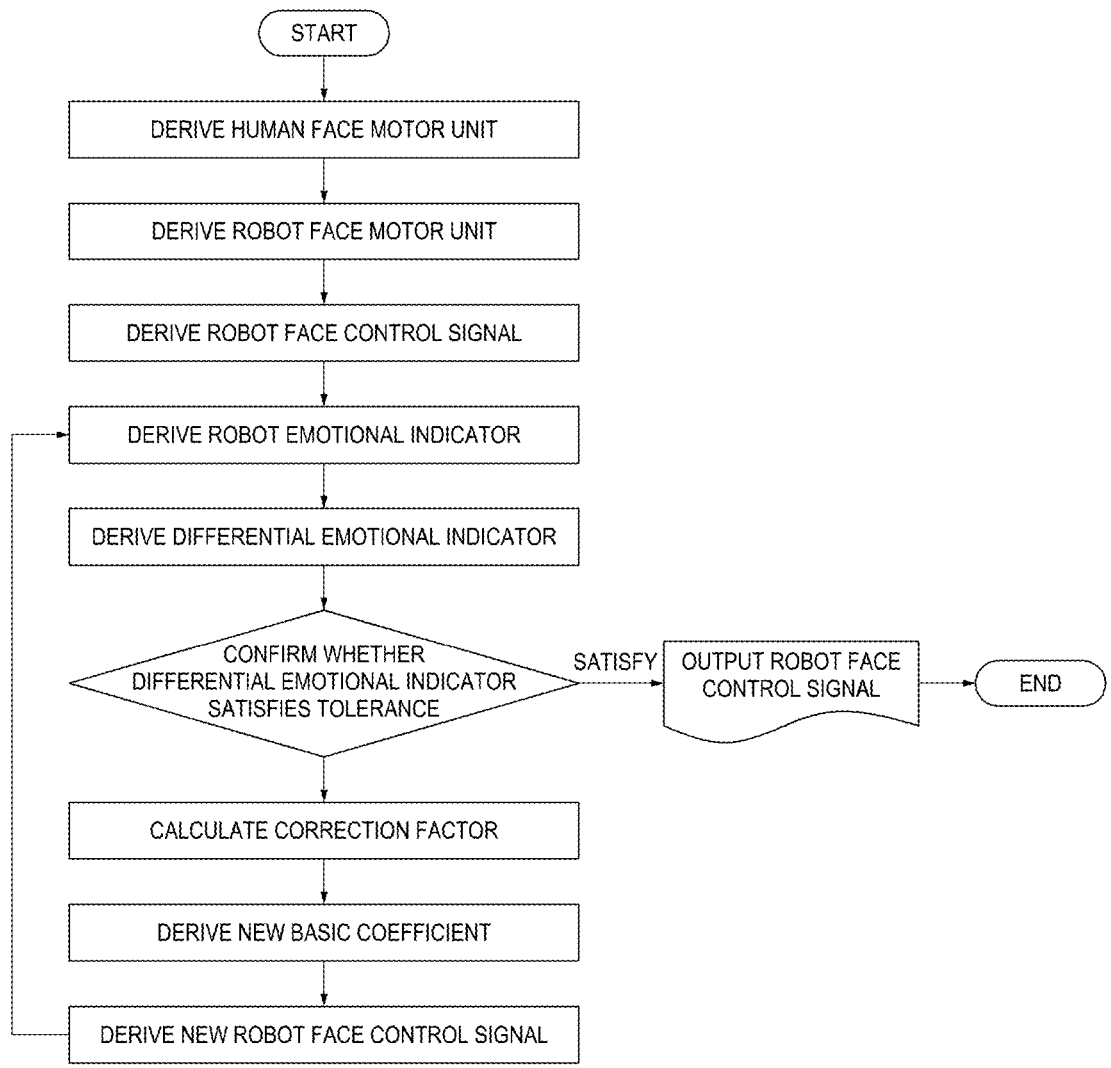
FIG. 2 is an algorithm flowchart illustrating a method for learning and embodying a human facial expression by a robot according to an embodiment of the present invention.

FIG. 1 is a flowchart illustrating a method for learning and embodying a human facial expression by a robot according to an embodiment of the present invention, and FIG. 2 is an algorithm flowchart illustrating a method for learning and embodying a human facial expression by a robot according to an embodiment of the present invention.

Figure 3:
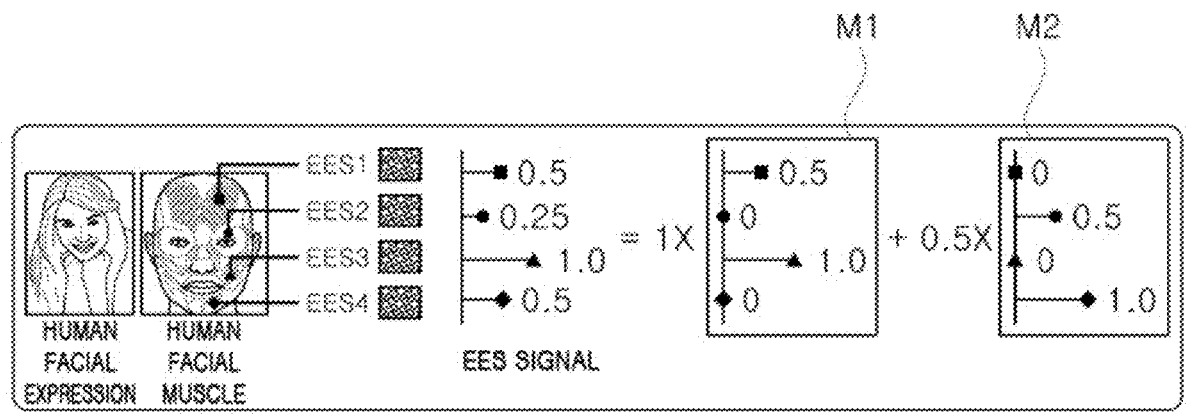
FIG. 3 is an exemplary drawing of a step of deriving a human face motor unit of a method for learning and embodying a human facial expression by a robot according to an embodiment of the present invention.
Figure 4:
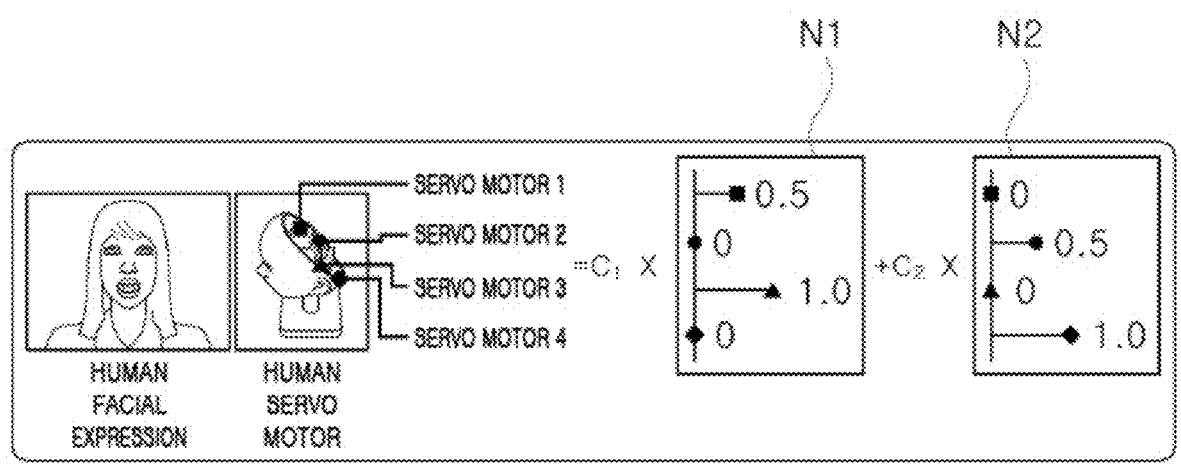
FIG. 4 is an exemplary drawing of a step of deriving a robot face motor unit and a step of deriving a robot face control signal according to an embodiment of the present invention.
Figure 5:
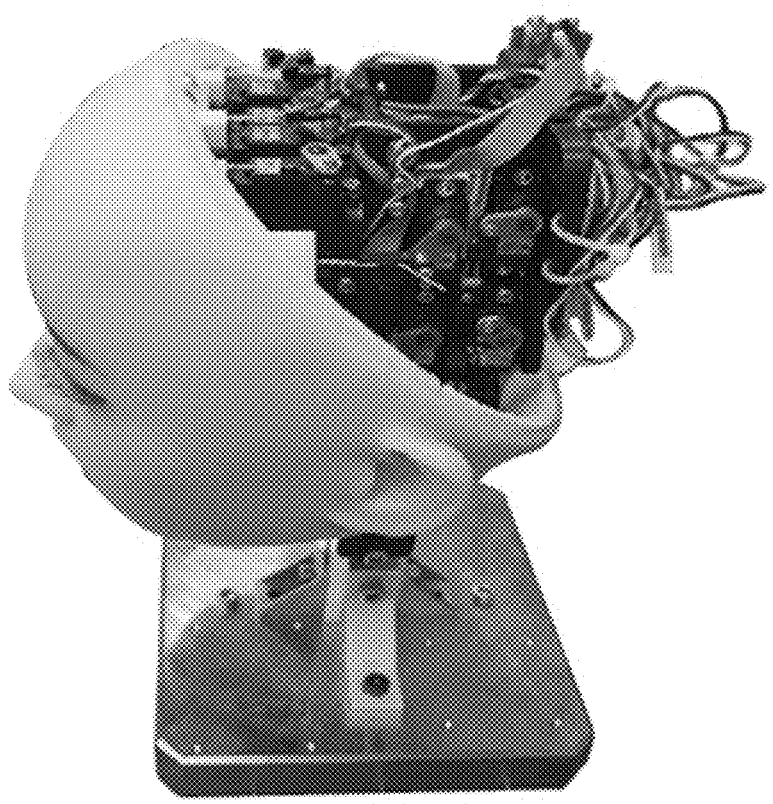
FIG. 5 is a photo illustrating a robot provided with a servo motor according to an embodiment of the present invention.

FIG. 3 is an exemplary drawing of a step of deriving a human face motor unit of a method for learning and embodying a human facial expression by a robot according to an embodiment of the present invention, FIG. 4 is an exemplary drawing of a step of deriving a robot face motor unit and a step of deriving a robot face control signal according to an embodiment of the present invention, and FIG. 5 is a photo illustrating a robot provided with a servo motor according to an embodiment of the present invention.

Referring to FIG. 1 to FIG. 5, the method for learning and embodying a human facial expression by a robot may be provided to perform a step S10 of measuring epidermal electric sensor (EES) signals of human facial muscles in accordance with a preset human emotional indicator and deriving a plurality of human face motor units corresponding to the human emotional indicator.

In the step S10 of measuring epidermal electric sensor (EES) signals of human facial muscles in accordance with a preset human emotional indicator and deriving a plurality of human face motor units corresponding to the human emotional indicator, the human face motor unit may be derived by applying a non-negative matrix factorization (NMF) algorithm to time-series data of vector values of EES signals of human facial muscles.

As an example, as illustrated in FIG. 3, first, when a person makes a happy face, it is possible to measure EES signals at a plurality of points of face muscles in this state. A human face motor unit may be derived in a form of grouping EES signals at each spot by applying a non-negative matrix factorization (NMF) algorithm to time-series data of vector values of the EES signals at the plurality of spots.

As a specific example, a first human face motor unit M1 and a second human face motor unit M2 illustrated in FIG. 3 are represented by grouping EES signals measured at four points.

A value obtained by multiplying each of the first human face motor unit M1 and the second human face motor unit M2 by a coefficient is provided to match with an EES signal value measured at each facial muscle point.

In addition, in the step S10 of measuring epidermal electric sensor (EES) signals of human facial muscles in accordance with a preset human emotional indicator and deriving a plurality of human face motor units corresponding to the human emotional indicator, the human emotional indicator may be the sum of vector values of EES signals measured from a human facial expression expressing an emotion.

Specifically, vector values of EES signals are varied in accordance with expressions according to human emotions. As a result, the sums of the vector values of the EES signals correspond to human emotions one-to-one. In other words, as human emotional indicators correspond to human emotions one-to-one, it is possible to know a human emotion if a human emotional indicator is known. On the contrary, it is possible to know a human emotional indicator if a human emotion is known.

In addition, the number of human face motor units may be equal to the number of preset human emotional indicators.

After the step S10 of measuring epidermal electric sensor (EES) signals of human facial muscles in accordance with a preset human emotional indicator and deriving a plurality of human face motor units corresponding to the human emotional indicator, a step S20 of deriving a plurality of robot face motor units to correspond to the human face motor units on the basis of servo motors installed to correspond to human facial muscles may be performed.

In the step S20 of deriving a plurality of robot face motor units to correspond to the human face motor units on the basis of servo motors installed to correspond to human facial muscles, the robot face motor unit may be formed by combination of the plurality of servo motors.

Specifically, the plurality of servo motors may be connected to wires provided to correspond to human facial muscles. The robot face motor units may be provided by combining the servo motors to correspond to the human face motor units, respectively.

As an example, as illustrated in FIG. 4, a first robot face motor unit N1 may be provided by combining servo motors to correspond to a first human face motor unit M1, and a second robot face motor unit N2 may be provided by combining servo motors to correspond to a second human motor unit M2.

The number of robot face motor units may be equal to the number of human face motor units.

After the step S20 of deriving a plurality of robot face motor units to correspond to the human face motor units on the basis of servo motors installed to correspond to human facial muscles, a step S30 of deriving a robot face control signal by combining the plurality of robot face motor units with a basic coefficient to express the human emotional indicator may be performed.

In the step S30 of deriving a robot face control signal by combining the plurality of robot face motor units with a basic coefficient to express the human emotional indicator, the robot face control signal may be formed of the sum of a plurality of basic coefficients multiplied in one-to-one correspondence with the plurality of robot face motor units.

As described above, according to the present invention, the number of robot face motor units formed by grouping the servo motors is made equal to the number of human emotional indicators to coincide dimensions. In addition, the servo motors are not individually controlled, but the servo motors are controlled by changing the basic coefficient, thereby reducing the number of control inputs. In other words, the robot face motor unit can control and derive a robot control signal by using the basic coefficient as a meta parameter in a fixed state.

After the step S30 of deriving a robot face control signal by combining the plurality of robot face motor units with a basic coefficient to express the human emotional indicator, a step S40 of expressing a robot facial expression in accordance with the robot face control signal and deriving a robot emotional indicator may be performed.

In the step S40 of expressing a robot facial expression in accordance with the robot face control signal and deriving a robot emotional indicator, the robot emotional indicator may be the sum of vector values of servo motors measured from the robot facial expression expressing an emotion.

In this case, in the step S40 of expressing a robot facial expression in accordance with the robot face control signal and deriving a robot emotional indicator, the robot emotional indicator may be a value obtained by using a face reader (Noldus Face Reader, iMotion, OpenFace, etc.).

Figure 6:
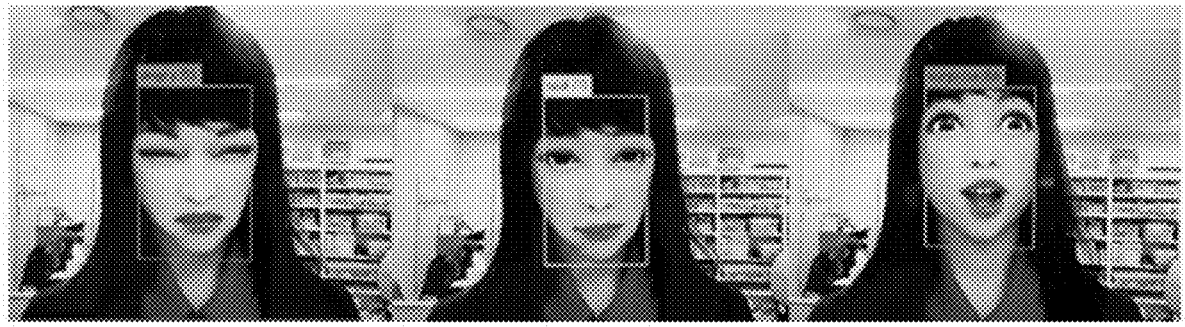
FIG. 6 is photos illustrating robot emotional indicators based on facial expressions of a robot according to an embodiment of the present invention.

FIG. 6 is photos illustrating robot emotional indicators based on facial expressions of a robot according to an embodiment of the present invention.

As an example, as illustrated in FIG. 6, the robot emotional indicator may be the sum of vector values of servo motors measured from the robot facial expression expressing an emotion.

After the step S40 of expressing a robot facial expression in accordance with the robot face control signal and deriving a robot emotional indicator, a step S50 of deriving a differential emotional indicator which is difference between the human emotional indicator and the robot emotional indicator may be performed.

After the step S50 of deriving a differential emotional indicator which is difference between the human emotional indicator and the robot emotional indicator, a step S60 of calculating a correction factor of the robot face motor unit from the differential emotional indicator may be performed.

In the step S60 of calculating a correction factor of the robot face motor unit from the differential emotional indicator, the correction factor may be calculated through machine learning technique such as Genetic algorithm, Artificial Neural Network, and Deep learning.

Specifically, the robot face control signal has a nonlinear relationship with an expression of the robot. In other words, since human muscles does not completely coincide with servo motors and wires provided in the robot, it is difficult to have a facial expression of the robot completely coincide with a human facial expression when the facial expression is measured by using a facial expression reader even though the servo motors are controlled to correspond to the EES signals.

Accordingly, in the step S60 of calculating a correction factor of the robot face motor unit from the differential emotional indicator, the correction factor can be calculated through the machine learning method described above.

After the step S60 of calculating a correction factor of the robot face motor unit from the differential emotional indicator, a step S70 of deriving a new basic coefficient by summing the basic coefficient and the correction factor may be performed.

After the step S70 of deriving a new basic coefficient by summing the basic coefficient and the correction factor, a step S80 of deriving a new robot face control signal by combining the plurality of robot face motor units with the new basic coefficient may be performed.

The step S40 of expressing a robot facial expression in accordance with the robot face control signal and deriving a robot emotional indicator to the step S80 of deriving a new robot face control signal by combining the plurality of robot face motor units with the new basic coefficient may be repeated, until the differential emotional indicator satisfies a preset tolerance in the step S50 of deriving a differential emotional indicator which is difference between the human emotional indicator and the robot emotional indicator.

The machine learning is automatically performed until the differential emotional indicator satisfies a preset tolerance. When the differential emotional indicator satisfies the preset tolerance, a robot face control signal at that time is derived as a result value and can be applied to the robot.

According to the present invention as described above, the servo motors are allowed to coincide with dimensions of the human emotional indicators to perform the automatic machine learning, thereby deriving a robot face control signal such that the robot makes the best similar expression to the human facial expression more easily and rapidly.

Figure 7:
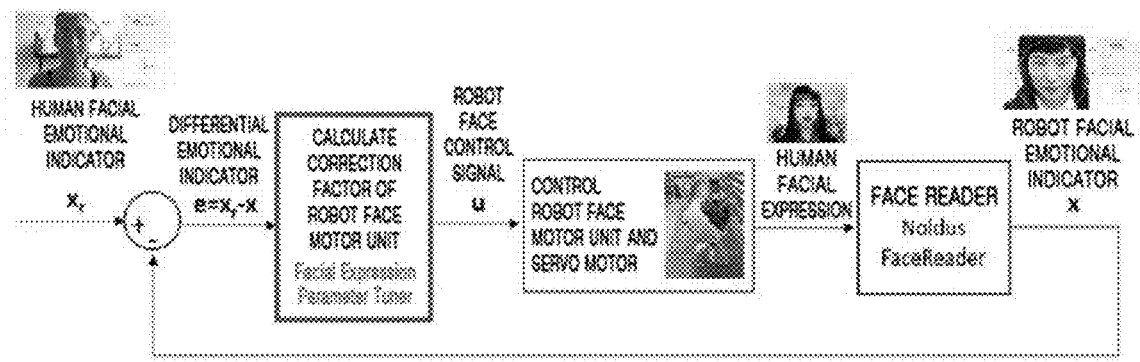
FIG. 7 is a diagram illustrating a method for learning and embodying a human facial expression by a robot according to an embodiment of the present invention.

FIG. 7 is a diagram illustrating a method for learning and embodying a human facial expression by a robot according to an embodiment of the present invention.

As illustrated in FIG. 7, according to the method for learning and embodying a human facial expression by a robot according to the present invention, the servo motors are allowed to coincide with dimensions of the human emotional indicators to perform the automatic machine learning, thereby deriving a robot face control signal such that the robot makes the best similar expression to the human facial expression more easily and rapidly.

Using the present invention as described above, a robot is made to learn human expressions to be used for a database for a social robot or HRI. The present invention can be applied to various motion learning of a robot as well as facial expressions.

According to the present invention, it is possible to prevent a problem of damage by overcurrent caused by applying an input equal to or more than a limit during control of servo motors.

As an advantage of the present invention with such a configuration, first, work manually repeated by a human is automated, and it is possible to shorten a time consumed in imitation of a human facial expression by a robot.

In addition, according to the present invention, it is possible to prevent a problem of damage by overcurrent caused by applying an input equal to or more than a limit during control of servo motors.

According to the present invention, by providing a mathematical basis and an algorithm for finding operation of each servo motor for a specific quantitative indicator, a robot can more accurately and rapidly imitate a human facial expression. Specifically, according to the present invention, a mathematical control method of coinciding dimensions between a human emotional indicator and a parameter value of a servo motor is provided, and an algorithm based on machine learning to imitate a human expression is provided. Accordingly, a robot can imitate an expression according to complex emotions of a human as it is.

The advantages of the present invention are not limited to the advantages described above, and it should be understood to include all advantages which can be deduced from the configuration of the present invention described in Detailed Description or Claims of the present invention.

The description of the present invention described above is for examples, and it should be understood that a person skilled in the art can easily modify the present invention into other specific forms without changing the technical spirit or essential features of the present invention. Therefore, it has to be understood the embodiments described above are exemplary in all aspects and is not limitative. For example, each constituent element described in a singular type may be embodied to be distributed, and constituent elements described as being distributed may be embodied in a coupled type likewise.

The scope of the present invention is represented by Claims to be described below, and it has to be interpreted that the meaning and scope of Claims and all modifications or modified forms derived from equivalent concept thereof are included in the scope of the present invention.

What is claimed is:

1. A method for learning and embodying a human facial expression by a robot, comprising:
    a) a step of measuring epidermal electric sensor (EES) signals of human facial muscles in accordance with a preset human emotional indicator and deriving a plurality of human face motor units corresponding to the human emotional indicator;
    b) a step of deriving a plurality of robot face motor units to correspond to the human face motor units on the basis of servo motors installed to correspond to human facial muscles;
    c) a step of deriving a robot face control signal by combining the plurality of robot face motor units with a basic coefficient to express the human emotional indicator;
    d) a step of expressing a robot facial expression in accordance with the robot face control signal and deriving a robot emotional indicator;
    e) a step of deriving a differential emotional indicator which is difference between the human emotional indicator and the robot emotional indicator;
    f) a step of calculating a correction factor of the robot face motor unit from the differential emotional indicator;
    g) a step of deriving a new basic coefficient by summing the basic coefficient and the correction factor; and
    h) a step of deriving a new robot face control signal by combining the plurality of robot face motor units with the new basic coefficient,
    wherein in the step (e), the steps (d) to (h) are repeated until the differential emotional indicator satisfies a preset tolerance.

2. The method for learning and embodying a human facial expression by a robot according to claim 1, wherein in the step (a), the human face motor unit is derived by applying a non-negative matrix factorization (NMF) algorithm to time-series data of vector values of EES signals of human facial muscles.

3. The method for learning and embodying a human facial expression by a robot according to claim 1, wherein in the step (a), the human emotional indicator is the sum of vector values of EES signals measured from a human facial expression expressing an emotion.

4. The method for learning and embodying a human facial expression by a robot according to claim 1, wherein in the step (b), the robot face motor unit is formed by combination of the plurality of servo motors.

5. The method for learning and embodying a human facial expression by a robot according to claim 1, wherein in the step (c), the robot face control signal is formed of the sum of a plurality of basic coefficients multiplied in one-to-one correspondence with the plurality of robot face motor units.

6. The method for learning and embodying a human facial expression by a robot according to claim 1, wherein in the step (d), the robot emotional indicator is the sum of vector values of servo motors measured from the robot facial expression expressing an emotion.

7. A robot to which the method for learning and embodying a human facial expression by a robot according to claim 1 is applied.

* * * * *